United States Patent [19]

Phillips, Jr. et al.

[11] Patent Number: 6,072,009
[45] Date of Patent: Jun. 6, 2000

[54] METHODS FOR VULCANIZING ELASTOMERS USING MONOMERIC DISTILLATE BY-PRODUCT

[75] Inventors: Claude Frank Phillips, Jr., Lynn Haven; Alexander J. Conte, Panama City Beach, both of Fla.

[73] Assignee: Arizona Chemical Company, Panama City, Fla.

[21] Appl. No.: 08/801,758

[22] Filed: Feb. 18, 1997

Related U.S. Application Data

[60] Continuation-in-part of application No. 08/463,292, Jun. 5, 1995, Pat. No. 5,576,619, which is a division of application No. 08/233,351, Apr. 26, 1994, abandoned.

[51] Int. Cl.$^7$ ................................................. C08C 19/20
[52] U.S. Cl. ........................................ 525/346; 525/332.6
[58] Field of Search ..................................... 525/346, 386

[56] References Cited

U.S. PATENT DOCUMENTS

| | | |
|---|---|---|
| 2,155,009 | 4/1939 | Fawcett et al. . |
| 2,423,751 | 7/1947 | Bernstein . |
| 2,470,417 | 5/1949 | Vanderbilt et al. . |
| 2,479,226 | 8/1949 | George . |
| 2,596,886 | 5/1952 | Borglin et al. . |
| 2,876,203 | 3/1959 | Miller et al. . |
| 3,100,195 | 8/1963 | Zomlefer . |
| 3,189,567 | 6/1965 | Giller . |
| 3,325,429 | 6/1967 | Harris . |
| 3,330,790 | 7/1967 | Chambers . |
| 3,518,214 | 6/1970 | Wheelus . |
| 3,528,959 | 9/1970 | Patrick, Jr. et al. . |
| 3,624,051 | 11/1971 | Bauer et al. . |
| 3,647,704 | 3/1972 | Schrantz . |
| 3,856,729 | 12/1974 | Shimozato et al. . |
| 3,862,051 | 1/1975 | Coran et al. ............................. 252/182 |
| 3,980,630 | 9/1976 | Ishigami et al. . |
| 4,007,145 | 2/1977 | Edmondson . |
| 4,154,911 | 5/1979 | Bak et al. . |
| 4,229,503 | 10/1980 | Day . |
| 4,244,413 | 1/1981 | Takahashi et al. ....................... 152/323 |
| 4,463,120 | 7/1984 | Collins et al. .......................... 524/274 |
| 4,544,726 | 10/1985 | Alford et al. . |
| 4,569,382 | 2/1986 | Maxey et al. ............................ 152/548 |
| 4,617,212 | 10/1986 | Kuan .......................................... 428/36 |
| 4,623,414 | 11/1986 | Collins et al. ........................ 156/307.5 |
| 4,870,135 | 9/1989 | Mowdood et al. ..................... 525/236 |
| 4,895,911 | 1/1990 | Mowdood et al. ..................... 525/346 |
| 5,093,388 | 3/1992 | Siemon, Jr. et al. ................... 523/149 |
| 5,252,650 | 10/1993 | Wideman et al. ...................... 524/318 |
| 5,284,890 | 2/1994 | Collyer et al. .......................... 525/203 |
| 5,344,864 | 9/1994 | Kushida et al. ........................ 524/426 |

*Primary Examiner*—Christopher Henderson
*Attorney, Agent, or Firm*—Luedeka, Neely & Graham, P.C.

[57] ABSTRACT

The specification discloses a method for vulcanizing an elastomer using as the cure promoter the monomeric distillate by-product from the clay-based dimerization of an unsaturated fatty acid mixture, preferably a tall oil fatty acid mixture. The distillate provides a cost-effective alternative to conventional fatty acid promoters.

13 Claims, No Drawings

METHODS FOR VULCANIZING ELASTOMERS USING MONOMERIC DISTILLATE BY-PRODUCT

This application is a continuation-in-part of application Ser. No. 08/463,292 filed Jun. 5, 1995 now U.S. Pat. No. 5,576,619 which is a division of application Ser. No. 08/233,351, filed Apr. 26, 1994, now abandoned.

The present invention relates to cure promoters and methods for vulcanizing elastomers.

Many uses of elastomeric materials require that the polymer chains in the elastomer be cross-linked. Crosslinking of the polymer chains in an elastomeric matrix is typically referred to as curing or vulcanization. Crosslinking is commonly accomplished using sulfur or an organic sulfur compound at an elevated temperature. As a result of crosslinking, the cured elastomer is elastic, i.e., it deforms under stress yet returns to the shape it had when the stress is removed, has improved tensile strength, reduced temperature sensitivity, higher elongation, greater tear resistance and increase hardness or durometer.

During the vulcanization reaction, elastomers are typically reacted with sulfur in the presence of a cure activator or promoter. Commonly used cure activators are oleic and stearic acids combined with zinc oxide and a cure accelerator. However, oleic and stearic acids are relatively expensive and since they are used in large quantities in rubber formulations, they contribute to the high cost of many elastomeric products.

Various alternatives to stearic acid have been proposed including the use of tall oil fatty acid mixtures as described in U.S. Pat. Nos. 4,870,135 and 4,895,911 to Mowdood et al. However, these products are also relatively expensive and are subject to price fluctuations which lead to market instabilities.

It is therefore an object of the invention to provide a cost effective cure promoter and method of using the same for vulcanizing elastomeric materials.

Another object of the invention is to provide a low cost alternative to stearic acid as a cure promoter for an elastomeric material.

A further object of the present invention to provide a cure promoter for an elastomeric formulation which is readily available and which may be substituted directly for stearic acid in an elastomeric composition without adversely affecting the properties of the resulting cured elastomer.

An additional object of the invention is to provide a method for promoting the cure of elastomers using a relatively inexpensive cure promoter.

Having regard to the above and other objects, the invention provides a method for making a cross-linked elastomer which comprises compounding a mixture including a vulcanizable elastomer, a sulfur source and from about 0.1 to about 6% by weight of a monomeric distillate by-product from the clay-catalyzed dimerization of fatty acids. The compounded mixture is then heated to a temperature sufficient to cause substantial crosslinking of the elastomer.

The monomeric distillate by-product used in the present invention is a low cost alternative to stearic acid, oleic acid and tall oil fatty acid (TOFA) and is available in plentiful supply. The monomeric distillate by-product may be obtained from the clay-catalyzed dimerization of fatty acids obtained from oils selected from the group consisting of linseed, canola, soybean, rapeseed and tall oils or blends of the fatty acids obtained from two or more of the foregoing oils. It is especially preferred to use the monomeric distillate by-product from the clay-catalyzed dimerization reaction of tall oil fatty acids (TOFA). Although TOFA is produced in large quantities from renewable resources and is itself a known cure promoter for vulcanization, the monomeric distillate by-product from the clay-based dimerization of TOFA has not been recognized as having utility in such applications. The composition of the distillate is quite different from that of either the dimer product or the TOFA raw material. In fact, as described in U.S. Pat. No. 3,925,342 to Scharrer, incorporated herein by reference, it was observed that the dimerization by-product from the clay-based dimerization of TOFA has very limited utility due to the presence of the branched chain isomers produced during the dimerization process, the TOFA being characterized as containing principally straight chain fatty acids.

However, it has now been discovered that the dimerization distillate by-product does in fact provide an excellent alternative to TOFA as well as the traditional substantially pure stearic or oleic acid materials as a promoter for vulcanization reactions. When it is realized that recent increased production of TOFA dimer products for other uses will inevitably result in substantially increased accumulation of the monomeric distillate by-product, the advantages of the invention which provide a highly beneficial utility for this material become very significant. Also, disposal problems associated with increased production of the TOFA dimer by-products are considerably lessened and the goal of full utilization of components of the renewable resource (wood) from which these products are derived is furthered to a great extent.

The invention is applicable to a wide range of elastomers including, but not limited to, polymers, copolymers and terpolymers of substituted and unsubstituted olefinic compounds, arene compounds and olefinic and arene compounds such as natural and synthetic rubber. Synthetic rubbers include polybutadiene rubber, polyisoprene rubber, styrene-butadiene rubber, butyl rubber, halogenated butyl rubbers such as chlorobutyl and bromobutyl rubber, chlorinated polyethylene rubber, chlorosulfonated polyethylene, nitrile rubber, chloroprene rubber, ethylene-propylene terpolymer rubber such as ethylene-propylene-diene monomer, silicone rubber, neoprene rubber, polysulfides, polyacrylate rubber, epichlorohydrin rubber, fluoroelastomers, polyurethanes and thermoplastic rubber.

The amount of elastomer present in an elastomeric formulation may vary widely depending on the desired product qualities. Typically, the elastomeric formulation will contain from about 55 to about 85% by weight of elastomer which may be a single elastomer or a mixture of elastomers.

Elemental sulfur is the most commonly used sulfur source for providing the vulcanizing agent, however, an organic sulfur compound such as an olefin adduct, an amine disulfide or a polymeric polysulfide may also be used as a source of sulfur. The amount of sulfur required in the elastomeric formulation to produce substantial crosslinking may range from about 0.5 to about 5% by weight free sulfur based on the total weight of the formulation.

It is known that low sulfur ratios tend to improve the resistance of the vulcanizate to deterioration during aging. Accordingly, when it is desired to produce elastomeric compositions having a low sulfur ratio and short curing time, organic accelerators are often combined with vulcanization promoters such as stearic acid or oleic acid and/or metal oxide activators such as zinc oxide, calcium oxide, magnesium oxide and lead oxide.

According to a preferred embodiment of the invention, the vulcanization promoter is provided by the monomeric distillate by-product from the clay-catalyzed dimerization of TOFA. The distillate by-product from the clay-based dimerization of TOFA is believed to be composed of a mixture of $C_{16}$ to $C_{18}$ monounsaturated fatty acids which are predominantly randomly branched isomers having the single double bond located at random positions in the molecules. If the distillate by-product is obtained from a fatty acid mixture other than tall oil, the by-product may contain a significant quantity of branched $C_{20}$ to $C_{22}$ monounsaturated fatty acids. The by-product will typically be effective as a promoter in a concentration ranging from about 0.1 to about 6% by weight based on the total weight of the composition mixture prior to vulcanization. Preferably, the by-product comprises about 0.7 to about 1.4 wt. % of the pre-vulcanized mixture.

The clay-catalyzed dimerization of TOFA is conventionally carried out by contacting TOFA with a naturally occurring bentonite, montmorillonite clay, classified by Chemical Abstracts Number (CAS#) 1302-78-9 in a reaction vessel. The reaction mixture is held at a temperature in the range of from about 200° C. to about 260° C., under steam pressure in the range of from about 3.4 atm. to about 6.8 atm., for about 4 hours. After the reaction is substantially complete, the clay is filtered out leaving a reaction product comprising unreacted monomeric material (about 30 to 40% of the original TOFA) as a by-product and dimeric/trimeric fatty acid material. The monomeric material is distilled off at from about 250° C. to about 280° C. under vacuum of from about 1 millimeter to about 2 millimeters of mercury yielding the monomeric material as a distillate by-product with the dimeric/trimeric fatty acids remaining as bottoms.

Without being bound by theory, it is believed that in the acidic environment on the surface of the clay in the dimerization process, a portion of the original straight chain fatty acids, mostly fatty acids containing from about 16 to about 18 carbon atoms, are rearranged to the iso- or branched-chain acids and that these rearranged acids form the chief constituents of the monomeric distillate by-product. It is now believed that these iso- or branched-chain fatty acids in the by-product exhibit a relatively high degree of monounsaturation and contain a relatively small percentage of di- or poly-unsaturated fatty acids.

Typically, elastomers are compounded prior to vulcanization or curing in order to provide the most suitable combination of materials in their correct proportion so that the finished elastomeric product is of the desired quality and is produced at the lowest cost possible. Accordingly, the processes of mixing, forming and curing are essential and well-known fabrication steps for commercially significant elastomers.

The mixing operation is important because processing steps subsequent to mixing depend on an adequate and substantially uniform mixture of ingredients. The primary objectives of mixing include obtaining a uniform blend of ingredients, attaining adequate dispersion of fillers and producing consecutive uniform batches having similar degrees of viscosity and dispersion of the filler. The ingredients may be mixed using roll mills and internal mixers, e.g., a BANBURY mixer available from Farrel Corporation of Ansonia, Conn., an INTERMIX mixer available from Francis Shaw & Company, Ltd. of Manchester, England or a BOLLING mixer available from Kobelco Steward Bolling, Inc. of Cleveland, Ohio for batch mixing operations. Continuous mixers such as a FARREL mixer available from Farrel Corporation, a KO-KNEADER mixer available from B&P Process Equipment and Systems, LLC of Saginaw, Mich. or a KNEADERMASTER mixer available from Gorman-Rupp Company of Mansfield, Ohio may also be used.

It is important during compounding or mixing to prevent any appreciable crosslinking of the elastomer so that the ingredients are homogeneously mixed without a substantial increase in viscosity of the formulation. In order to prevent premature crosslinking, delayed-reaction accelerators are used. Thus, compounds which are commonly used as accelerators generally do not act as accelerators initially, but undergo a chemical reaction during the rubber processing step to produce the active accelerator species. When more delay in crosslinking is required, a vulcanization retarder can also be used.

A wide variety of accelerators may be used in rubber compounding, however, the most common is comprised of derivatives of 2-mercaptobenzothiazole. Accordingly, the accelerators may be selected from the group consisting of 2-mercaptobenzothiazole, bis(2,2-benzothiazolyl)disulfide, N-tert-butyl-2-benzothiazolesulfenamide, N-cyclohexyl-2-benzothiazolesulfenamide, 2-(4-morpho-linylthio) benzothiazole, zinc O,O-di-n-butyl phosphorodithioate, 1,3-diphenyl-guanidine, ethylenethiourea (2-imidazolidinethione), tetramethylthiuram disulfide, tetramethyl-thiuram monosulfide, and N-oxydiethylenethiocarbamyl-N'-oxydiethylene-sulfenamide. The amount of accelerator in the formulation may range from about 0.4 to about 0.8% by weight of the total formulation.

A suitable retarder for elastomeric matrixes includes N-(cyclohexylthio)phthalimide. Other retarders include salicylic acid and phthalic anhydride. The amount of retarder used in the formulation may range from about 0.1 to about 0.5% by weight of the total formulation.

Reinforcing aids or fillers may also be used to improve the properties of the vulcanizates. The most common reinforcing aids are carbon black and silica. The degree of reinforcement increases with a decrease in the particle size of the filler. Silica and/or carbon black may be used in the elastomeric formulation in an amount ranging from about 2 to about 40 percent by weight of the formulation. The silica may be any silica conventionally used in elastomeric compositions including precipitated silica such as fumed or pyrogenic silica composed of from about 80 to about 99.9% by weight $SiO_2$. It is preferred that the silica be in a relatively fine, subdivided state so that it has an average particle size in the range of from about 1 to about 100 nm for optimal dispersion in the elastomeric material. The silica generally may have a surface area ranging from about 45 to about 700 $m^2$/gram, preferably from about 100 to about 300 $m^2$/gram, and a bulk density ranging from about 0.03 to about 0.3 gram/$cm^3$.

In addition to the fillers and accelerators, the elastomeric compositions may include softeners, tackifying agents, extenders, plasticizers, bonding or reinforcing agents, antioxidants and stabilizers. These ingredients are typically used in minor amounts in the formulation and may comprise only about 10 weight percent or less of the total weight of the formulation.

In order to prepare a cured elastomer according to the invention, a formulation comprising an elastomer, a vulcanizing agent, an accelerator, a vulcanization promoter and, optionally, a filler, is prepared by combining the ingredients in any order in a high shear mixer such as a BANBURY mixer. Once the ingredients are sufficiently mixed, the elastomeric formulation may be formed, molded, calendered and/or extruded. Subsequent to forming, molding, calendering and/or extrusion, heat is applied to the formulation to vulcanize the elastomer by promoting cross-link bonds in the elastomer. The formulation may be cured by heating to a temperature ranging from about 140° to about 160° C. for a period of time ranging from about 15 minutes to about 30 minutes.

The following nonlimiting examples further illustrate various aspects of the invention.

EXAMPLES

Rubber formulations were compounded and cured at 149° C. for 20 minutes in order to produce specimens according to ASTM D 3182 for use in comparing rheological properties of the cured rubbers. One set of samples was made from formulations containing stearic acid while the other set of samples was made from formulations containing the monomeric distillate fraction from a clay-based dimerization process for tall oil fatty acid. The formulations were cross-linked with elemental sulfur available from Harwick Chemical Corporation of Akron, Ohio and are contained in the following table.

TABLE 1

| Component | Sample #1 (wt. %) | Sample #2 (wt. %) | Sample #3 (wt. %) | Sample #4 (wt. %) | Sample #5 (wt. %) | Sample #6 (wt. %) |
| --- | --- | --- | --- | --- | --- | --- |
| SIR-10[1] | 41.8 | 41.8 | 41.5 | 41.5 | 41.8 | 41.8 |
| PBD 220[2] | 17.9 | 17.9 | 17.8 | 17.8 | 17.9 | 17.9 |
| N660 Carbon Black[3] | 29.9 | 29.9 | 29.7 | 29.7 | 29.9 | 29.9 |
| FLEXON 111[4] | 4.2 | 4.2 | 4.2 | 4.2 | 4.2 | 4.2 |
| AGERITE SUPERLITE[5] | 0.6 | 0.6 | 0.6 | 0.6 | 0.6 | 0.6 |
| DUREZ 29095[6] | 1.8 | 1.8 | 1.8 | 1.8 | 1.8 | 1.8 |
| OBTS[7] | 0.5 | 0.5 | 0.5 | 0.5 | 0.5 | 0.5 |
| sulfur[8] | 1.2 | 1.2 | 1.2 | 1.2 | 1.2 | 1.2 |
| KADOX 911[9] | 1.4 | 1.4 | 1.4 | 1.4 | 0.7 | 0.7 |
| INDUSTRENE R[10] | — | 0.7 | — | 1.4 | — | 1.4 |
| SYLFAT D-1[11] | 0.7 | — | 1.4 | — | 1.4 | — |

[1]SIR-10 is Standard Indonesian natural rubber, grade 10 available from Akrochem Corporation of Akron, Ohio.
[2]PBD 220 is polybutadiene rubber commercially available from Bayer Corporation of Pittsburgh, Pennsylvania.
[3]N660 Carbon Black is commercially available from Cabot Corporation of Atlanta, Georgia.
[4]FLEXON 111 is a high aromatic petroleum oil used as a plasticizer or extender commercially available from Exxon Chemical Company of Houston, Texas.
[5]AGERITE SUPERLITE is a polyalkyl polyphenol antioxidant commercially available from R. T. Vanderbilt Company of New York, New York.
[6]DUREZ 29095 is an alkyl phenol-formaldehyde thermoplastic tackifying agent commercially available from Hooker Chemical & Plastics Div. of Tonawanda, New York.
[7]OBTS is an N-oxydiethylene-2-benthiazole sulfenamide accelerator commercially available from Akrochem Corporation of Akron, Ohio.
[8]Sulfur is available from Harwick Chemical Corporation of Akron, Ohio.
[9]KADOX 911 is zinc oxide accelerator activator commercially available from New Jersey Zinc Company of Bethlehem, Pennsylvania.
[10]INDUSTRENE R is a stearic acid crosslinking agent having an acid number of 199, an iodine value of 5, 0.6% by weight unsaponifiables and containing 76 wt. % stearic acid and 18 wt. % palmitic acid as determined by GLC analysis commercially available from Humko of Memphis, Tennessee.
[11]SYLFAT D-1 is a monomeric distillate product from the clay-based dimerization of TOFA having an acid value of 170 to 185, an iodine value of about 73, 6.8 wt. % unsaponifiables, 1–2 wt. % palmitic acid, 34–41 wt. % isostearic/isooleic acid, 12 to 17 wt. % stearic acid, 8 to 11 wt. % oleic acid and 20–26 wt. % other acids and is commercially available from Arizona Chemical Company of Panama City, Florida.

The above rubber formulations were tested for their rheological properties according to ASTM D 2084-93 using a TECH PRO MP-100 rheometer available from Diversified Data Corporation of Springfield, Va. The rheological properties of the foregoing cured samples are shown in Table 2.

TABLE 2

| Rheometer Data | Sample #1 | Sample #2 | Sample #3 | Sample #4 | Sample #5 | Sample #6 |
| --- | --- | --- | --- | --- | --- | --- |
| max. torque (MH, Lbf inch) | 25.75 | 27.10 | 27.04 | 28.44 | 26.40 | 27.68 |
| min. torque (ML, Lbf inch) | 6.20 | 6.32 | 5.56 | 6.03 | 5.85 | 6.03 |
| Scorch time (TS 2, minutes) | 8.25 | 8.33 | 8.50 | 8.83 | 8.58 | 8.46 |
| Cure time (TC 50%, minutes) | 12.21 | 12.33 | 12.54 | 12.92 | 12.17 | 12.42 |
| Cure time (TC 90%, minutes) | 16.50 | 17..04 | 17.79 | 18.67 | 17.25 | 17.96 |

The foregoing example demonstrates that a rubber formulation cured with a monomeric distillate fraction obtained from the clay-based dimerization of TOFA (Samples 1, 3 and 5) is surprisingly comparable or has even slightly better rheological properties than the samples containing stearic acid as a vulcanization promoter (Samples 2, 4 and 6). Cure times for samples 1, 3 and 5 were also slightly better than the cure times for samples 2, 4 and 6.

Physical properties of cured test plaques were determined for the samples. The tear strength of the samples was determined using ASTM Die B specimens at a 20 inch per minute crosshead speed. The other tensile strength properties were determined using ASTM Die C dumbbell specimens at the same crosshead speed. The results of the physical tests are given in the following table.

TABLE 3

| Tensile Properties | Sample #1 | Sample #2 | Sample #3 | Sample #4 | Sample #5 | Sample #6 |
| --- | --- | --- | --- | --- | --- | --- |
| tear strength, ppi | 497 | 471 | 583 | 587 | 538 | 534 |
| ultimate elongation (%) | 670 | 650 | 650 | 610 | 620 | 630 |
| 100% modulus, psi | 220 | 240 | 230 | 270 | 230 | 260 |
| 200% modulus, psi | 550 | 600 | 580 | 660 | 570 | 650 |
| 300% modulus, psi | 1050 | 1130 | 1110 | 1230 | 1090 | 1190 |
| 400% modulus, psi | 1630 | 1740 | 1730 | 1910 | 1700 | 1810 |
| 500% modulus, psi | 2290 | 2390 | 2430 | 2610 | 2350 | 2480 |
| tensile strength, psi | 3450 | 3380 | 3480 | 3340 | 3260 | 3410 |
| Shore A durometer points | 54 | 56 | 53 | 58 | 53 | 56 |

As shown by the physical properties in the foregoing table, samples prepared using the monomeric distillate by-product also had slightly higher tensile strength, slightly lower modulus and slightly lower durometer than the samples prepare using stearic acid. However, the differences do not appear to be statistically significant and for all practical purposes, may be considered the same.

Accordingly, the monomeric distillate by-product, which is less costly than TOFA, stearic and oleic acids, has no manifest disadvantages in terms of compounding, compatibility or stability with respect to use of the by-product as a vulcanization promoter.

Although various embodiments and features of the invention have been described in the foregoing detailed description, those of ordinary skill will recognize the invention may be capable of numerous modifications, rearrangements and substitutions without departing from the scope of the invention as set forth in the appended claims.

What is claimed is:

1. A method for making a cross-linked elastomer which comprises compounding a mixture including a vulcanizable elastomer, a sulfur source and from about 0.1 to about 6% by weight of a monomeric distillate by-product from the clay-catalyzed dimerization of tall oil fatty acids and heating the compounded mixture to a temperature sufficient to cause substantial crosslinking of the elastomer.

2. The method of claim 1 wherein the distillate by-product contains from about 30 to about 45% by weight of unsaturated branched-chain isomers.

3. The method of claim 2 wherein the branched-chain isomers have from about 16 to about 18 carbon atoms.

4. The method of claim 1 wherein the distillate by-product contains a substantial portion of unsaturated branched-chain isomers having from about 16 to about 18 carbon atoms.

5. The method of claim 1 wherein the mixture further comprises a silica filler.

6. The method of claim 1 wherein the elastomer is selected from the group consisting of isoprene, butadiene, methylbutadiene, dimethylbutadiene, pentadiene, polybutadiene, polyisoprene and copolymers of the foregoing with styrene, methyl styrene, olefins selected from the groups consisting of ethylene, propylene and isobutylene and vinyl compounds selected from the group consisting of vinylchloride, acrylic acid, acrylonitrile, methacrylonitrile and methacrylic acid.

7. The method of claim 1 wherein the mixture further comprises carbon black and silica.

8. A method for making a cross-linked elastomer which comprises compounding a mixture including a vulcanizable elastomer, a sulfur source, a carbon black filler and from about 0.1 to about 6% by weight of a monomeric distillate by-product from the clay-catalyzed dimerization of tall oil fatty acids and heating the compounded mixture to a temperature sufficient to cause substantial crosslinking of the elastomer.

9. The method of claim 8 wherein the distillate by-product contains from about 30 to about 45% by weight of unsaturated branched-chain isomers.

10. The method of claim 9 wherein the branched-chain isomers have from about 16 to about 18 carbon atoms.

11. The method of claim 8 wherein the distillate by-product contains a substantial portion of unsaturated branched-chain isomers having from about 16 to about 18 carbon atoms.

12. The method of claim 8 wherein the mixture further comprises a silica filler.

13. The method of claim 8 wherein the elastomer is selected from the group consisting of isoprene, butadiene, methylbutadiene, dimethylbutadiene, pentadiene, polybutadiene, polyisoprene and copolymers of the foregoing with styrene, methyl styrene, olefins selected from the groups consisting of ethylene, propylene and isobutylene and vinyl compounds selected from the group consisting of vinylchloride, acrylic acid, acrylonitrile, methacrylonitrile and methacrylic acid.

* * * * *

UNITED STATES PATENT AND TRADEMARK OFFICE
CERTIFICATE OF CORRECTION

PATENT NO. : 6,072,009
DATED : June 6, 2000
INVENTOR(S) : Claude Frank Phillips, Jr.

Page 1 of 1

It is certified that error appears in the above-identified patent and that said Letters Patent is hereby corrected as shown below:

Under Related U.S. Application Data[60]:
After "Continuation-in-part application No. 08/463,292, June. 5, 1995", delete "Pat. No. 5,576,619" and insert --Pat. No. 5,756,619--

In the Specification:
Column 1, lines 5-7, after "continuation-in-part of application Serial No. 08/463,292, filed June 5, 1995 now U.S. Patent No.", delete "5,576,619" and insert --5,756,619--.

Signed and Sealed this

Twelfth Day of June, 2001

*Attest:*

*Attesting Officer*

NICHOLAS P. GODICI
*Acting Director of the United States Patent and Trademark Office*